US011734216B2

(12) United States Patent
Pugh et al.

(10) Patent No.: US 11,734,216 B2
(45) Date of Patent: *Aug. 22, 2023

(54) CASCADE COMMUNICATIONS BETWEEN FPGA TILES

(71) Applicant: Achronix Semiconductor Corporation, Santa Clara, CA (US)

(72) Inventors: Daniel Pugh, Los Gatos, CA (US); Raymond Nijssen, San Jose, CA (US); Michael Philip Fitton, Menlo Park, CA (US); Marcel Van der Goot, Pasadena, CA (US)

(73) Assignee: Achronix Semiconductor Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/675,549

(22) Filed: Feb. 18, 2022

(65) Prior Publication Data

US 2022/0214990 A1 Jul. 7, 2022

Related U.S. Application Data

(63) Continuation of application No. 16/656,685, filed on Oct. 18, 2019, now Pat. No. 11,288,220.

(51) Int. Cl.
*G06F 13/40* (2006.01)
(52) U.S. Cl.
CPC ................ *G06F 13/4027* (2013.01)
(58) Field of Classification Search
None
See application file for complete search history.

(56) References Cited

U.S. PATENT DOCUMENTS

| 5,682,107 A | 10/1997 | Tavana et al. |
| 6,148,316 A | 11/2000 | Herbert et al. |

(Continued)

FOREIGN PATENT DOCUMENTS

| CN | 102629189 A | 8/2012 |
| CN | 114930311 A | 8/2022 |

(Continued)

OTHER PUBLICATIONS

"U.S. Appl. No. 16/656,685, Final Office Action dated Mar. 30, 2021", 14 pgs.

(Continued)

*Primary Examiner* — Idriss N Alrobaye
*Assistant Examiner* — Dayton Lewis-Taylor
(74) *Attorney, Agent, or Firm* — Schwegman Lundberg & Woessner, P.A.

(57) ABSTRACT

A tile of an FPGA provides memory, arithmetic functions, or both. Connections directly between multiple instances of the tile are available, allowing multiple tiles to be treated as larger memories or arithmetic circuits. By using these connections, referred to as cascade inputs and outputs, the input and output bandwidth of the arithmetic and memory circuits are increased, operand sizes are increased, or both. By using the cascade connections, multiple tiles can be used together as a single, larger tile. Thus, implementations that need memories of different sizes, arithmetic functions operating on different sized operands, or both, can use the same FPGA without additional programming or waste. Using cascade communications, more tiles are used when a large memory is needed and fewer tiles are used when a small memory is needed and the waste is avoided.

20 Claims, 11 Drawing Sheets

(56) References Cited

U.S. PATENT DOCUMENTS

| | | | |
|---|---|---|---|
| 6,480,872 | B1 | 11/2002 | Choquette |
| 6,864,710 | B1 | 3/2005 | Lacey et al. |
| 7,360,026 | B1* | 4/2008 | Johnson .................. G06F 5/10 |
| | | | 710/310 |
| 9,083,340 | B1* | 7/2015 | Wu .................. H03K 19/1776 |
| 10,353,706 | B2 | 7/2019 | Kaul et al. |
| 11,288,220 | B2 | 3/2022 | Pugh et al. |
| 2005/0014421 | A1 | 6/2005 | Simkins et al. |
| 2005/0144215 | A1* | 6/2005 | Simkins .............. G06F 7/5443 |
| | | | 708/620 |
| 2006/0101244 | A1 | 5/2006 | Siu et al. |
| 2019/0196785 | A1 | 6/2019 | Danysh et al. |
| 2020/0076435 | A1* | 3/2020 | Wang .............. H03K 19/17724 |
| 2021/0042087 | A1 | 2/2021 | Pugh et al. |
| 2021/0117356 | A1 | 4/2021 | Pugh et al. |

FOREIGN PATENT DOCUMENTS

| WO | WO-2005066832 | A2 | 7/2005 |
|---|---|---|---|
| WO | WO-2021076275 | A1 | 4/2021 |

OTHER PUBLICATIONS

"U.S. Appl. No. 16/656,685, Non Final Office Action dated Aug. 20, 2021", 12 pgs.

"U.S. Appl. No. 16/656,685, Non Final Office Action dated Sep. 4, 2020", 11 pgs.

"U.S. Appl. No. 16/656,685, Notice of Allowance dated Nov. 17, 2021", 9 pgs.

"U.S. Appl. No. 16/656,685, Response filed Jun. 16, 2021 to Final Office Action dated Mar. 30, 2021", 12 pgs.

"U.S. Appl. No. 16/656,685, Response filed Oct. 22, 2021 to Non Final Office Action dated Aug. 20, 2021", 9 pgs.

"U.S. Appl. No. 16/656,685, Response filed Nov. 11, 2020 to Non Final Office Action dated Sep. 4, 2020", 12 pgs.

"International Application Serial No. PCT/US2020/051786, International Search Report dated Nov. 19, 2020", 2 pgs.

"International Application Serial No. PCT/US2020/051786, Written Opinion dated Nov. 19, 2020", 5 pgs.

"Chinese Application Serial No. 202080084489.9, Notification to Make Rectification mailed Jun. 24, 2022", W/O English Translation, 1 page.

"Chinese Application Serial No. 202080084489.9, Response filed Jul. 19, 2022 to Notification to Make Rectification mailed Jun. 24, 2022", 3 pgs.

"International Application Serial No. PCT/US2020/051786, International Preliminary Report on Patentability dated Apr. 28, 2022", 7 pgs.

"Chinese Application Serial No. 202080084489.9, Office Action dated Feb. 1, 2023", W/English Translation, 13 pgs.

"Chinese Application Serial No. 202080084489.9, Response filed Apr. 27, 23 to Office Action dated Feb. 1, 2023", w/ English Claims, 12 pgs.

* cited by examiner

CASCADE COMMUNICATIONS BETWEEN FPGA TILES

PRIORITY APPLICATIONS

This application is a continuation of U.S. patent application Ser. No. 16/656,685, filed Oct. 18, 2019, the content of which is incorporated herein by reference in its entirety.

BACKGROUND

A field programmable gate array (FPGA) is composed of an array of programmable logic blocks that are interconnected with a reconfigurable routing network. Logic blocks vary in type and typically include reconfigurable logic, memories, and arithmetic logic. Reconfigurable logic is commonly implemented with lookup tables. FPGA tiles communicate using the reconfigurable routing network, which has a bandwidth lower than the processing bandwidth of the FPGA tiles.

The reconfigurable routing network can be programmed to connect the logic blocks together in one of many possible configurations. This programmability comes at a cost. The routing network is typically less dense and supports less data than arithmetic logic blocks for a given area. As a result, the practical size/width of an arithmetic logic block is limited by the number of available inputs and outputs provided by the routing network. Although larger arithmetic operations can be achieved by cascading smaller arithmetic logic blocks, this approach introduces unnecessary latency and significantly reduces the overall logic density of an application.

BRIEF DESCRIPTION OF THE DRAWINGS

Some embodiments of the disclosed technology are illustrated by way of example and not limitation in the figures of the accompanying drawings.

DETAILED DESCRIPTION

Example methods, systems and circuits for cascade communications between FPGA tiles will now be described. In the following description, numerous examples having example-specific details are set forth to provide an understanding of example embodiments. It will be evident, however, to one of ordinary skill in the art that these examples may be practiced without these example-specific details, and/or with different combinations of the details than are given here. Thus, specific embodiments are given for the purpose of simplified explanation, and not limitation.

A tile of an FPGA provides memory, arithmetic functions, or both. Connections directly between multiple instances of the tile are available, allowing multiple tiles to be treated as larger memories or arithmetic circuits. By using these connections, referred to as cascade inputs and outputs, the input and output bandwidth of the arithmetic and memory circuits are increased, operand sizes are increased, or both.

By using the cascade connections, multiple tiles can be used together as a single, larger tile. Thus, implementations that need memories of different sizes, arithmetic functions operating on different sized operands, or both, can use the same FPGA without additional programming or waste. For example, an FPGA tile using a large memory can serve applications that need a large memory or a small memory, but the excess memory is wasted when only a small memory is needed. Using cascade communications, more tiles are used when a large memory is needed and fewer tiles are used when a small memory is needed and the waste is avoided.

Figure 1:
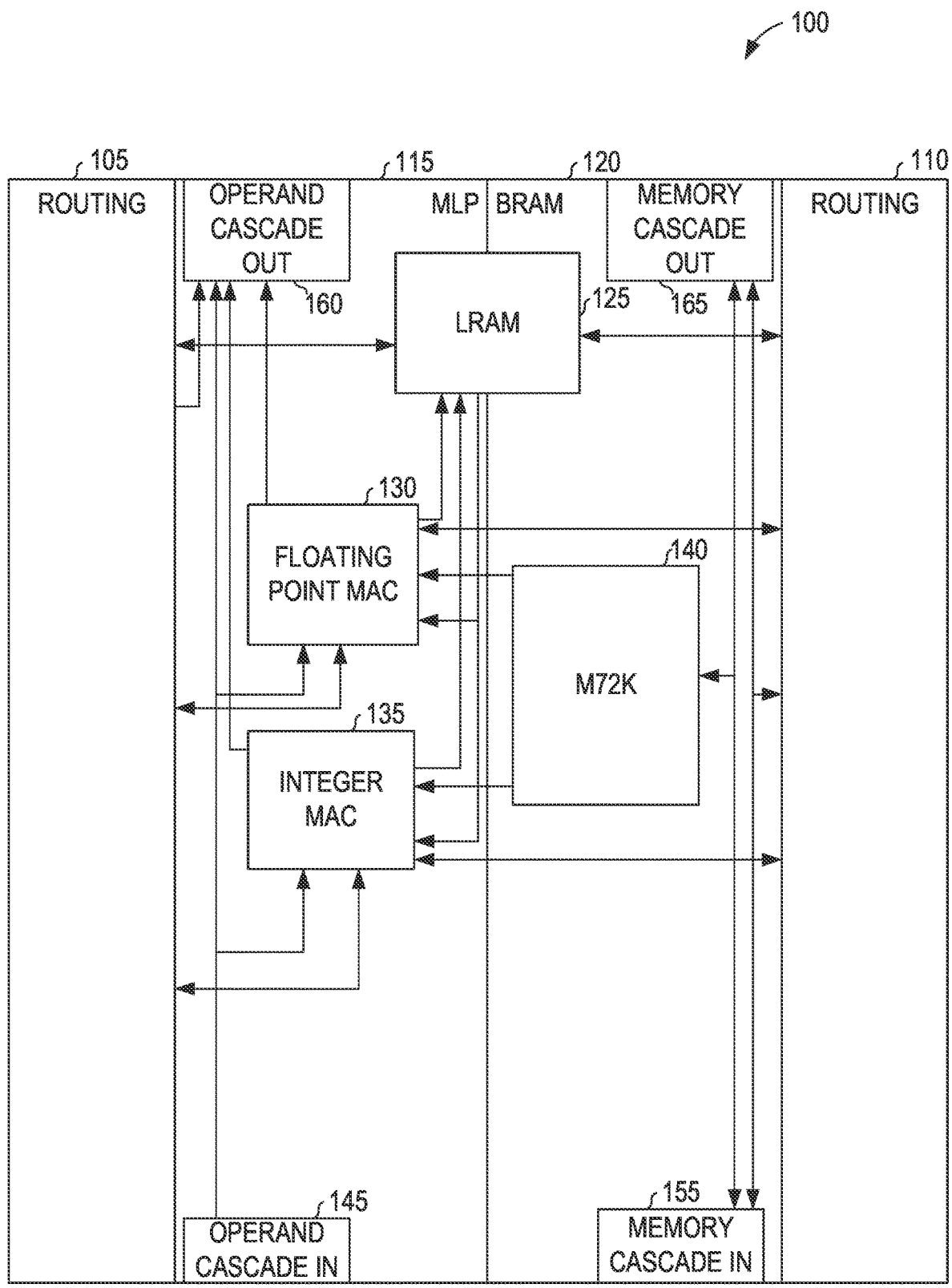
FIG. 1 is a high-level diagrammatic view of a tile of an FPGA that uses cascade communications between FPGA tiles, according to some example embodiments.

FIG. 1 is a high-level diagrammatic view of a tile 100 of an FPGA that uses cascade communications between FPGA tiles, according to some example embodiments. The connected routing 105 and 110 are also shown. The tile 100 fuses memory and arithmetic circuits and comprises a machine-learning processor (MLP) 115, a block random access memory (BRAM) 120, and a logic random access memory (LRAM) 125. The MLP 115 comprises a floating-point multiply and accumulate (MAC) 130 and an integer MAC 135. The BRAM 120 comprises a memory 140. The tile 100 is connected to other tiles via the routing 105 and the routing 110. Additionally, the tile 100 is directly connected to a first FPGA tile without using a routing connection of the FPGA via the operand cascade input 145 and the memory cascade input 155. The tile 100 is, in some example embodiments, further directly connected to a second FPGA tile without using the routing of the FPGA via the operand cascade output 160 and the memory cascade output 165. The cascade connections may be unidirectional or bidirectional.

In a first operation mode, the MACs 130 and 135 receive inputs from one or more of the routing 105, the LRAM 125, the memory 140, and an operand cascade input 145. Outputs are provided by the MACs 130 and 135 to the routing 105, an operand cascade output 160, the LRAM 125, or any suitable combination thereof. The memory 140 receives input from the routing 110, a memory cascade input 155, or both. Outputs are provided by the memory 140 to the routing 110, a memory cascade output 165, or both. In the first operation mode, the MACs 130 and 135 do not receive input from the routing 110 and the memory 140 does not receive input from the routing 105. Thus, the inputs from the routing fabric of the FPGA are divided between the MLP 115 and the BRAM 120, and the MLP 115 accesses data from the BRAM 120 within the tile 100, without going through the switch fabric.

Any number of tiles 100, communicating via cascade connections (e.g., the operand cascade input 145, the operand cascade output 160, the memory cascade input 155, and the memory cascade output 165), may be arranged to effectively create a larger tile. Each tile in the set of tiles may be configured to provide, as the cascade output, the received cascade input or to generate a result to provide as the cascade output. For example, the first tile in the set of tiles may receive data via the routing 105 and provide the data via the operand cascade output 160 to the second tile. The second and subsequent tiles may provide the data without modification by passing it through to their own operand cascade output 160. Alternatively, the cascade output of each tile may be affected by operations performed by the tile.

A typical MAC multiplies two products and adds the results to an accumulator. The MACs 130 and 135, in some example embodiments, provide additional functionality by allowing partial products to be summed and provided as an output before being added to the accumulator. Thus, the individual partial products, sums of partial products for a current multiplication, and an accumulation result across multiple multiplication cycles may all be accessed by use of the MACs 130 and 135.

In a second operation mode, the MACs 130 and 135 receive inputs from one or more of the routing 105, the routing 110, the LRAM 125, and the operand cascade input 145. Outputs are provided by the MACs 130 and 135 to the routing 105, the routing 110, the operand cascade output 160, the LRAM 125, or any suitable combination thereof. In the second operation mode, the memory 140 does not receive inputs from the routing 105 or the routing 110. Thus, in the second operation mode, the tile 100 operates as a dedicated MLP, with MLP 115 having full access to the routing fabric of the FPGA and the memory 140 effectively disabled. Nonetheless, the LRAM 125 may make use of some routing connections in the second operation mode.

In a third operation mode, the memory 140 receives input from the routing 105, the routing 110, the memory cascade input 155, or any suitable combination thereof. Outputs are provided by the memory 140 to the routing 105, the routing 110, the memory cascade output 165, or any suitable combination thereof. In the third operation mode, the MLP 115 does not receive inputs from the routing 105 or the routing 110. Thus, in the third operation mode, the tile 100 operates as a dedicated BRAM, with BRAM 120 having full access to the routing fabric of the FPGA and the MLP 115 effectively disabled.

As shown in FIG. 1, the LRAM 125 is connected to the routing 105 and the routing 110. In some example embodiments, the routing connections for the LRAM 125 are maintained in all operation modes. To use data stored in the LRAM 125 for calculations by the MLP 115, control signals identify the address to read and the data at that address in the LRAM 125 is used. The data is provided from the LRAM 125 to the MLP 115 via intra-tile connections, without using the routing 105 or the routing 110.

The intra-tile connections shown between the LRAM 125 and the memory 140 to the floating-point MAC 130 and the integer MAC 135 operate at a higher bandwidth than the routing 105 and 110. In various example embodiments, the intra-tile data access speed is a factor of at least 10, 50, 100, or 500 times faster than the routing connection access speed.

The differences between the LRAM 125 and the BRAM 120 are typically implementation details such that the BRAM 120 is similar to a cache style memory (typically using SRAM cells) and the LRAM 125 is similar to a register file (typically using flops). However, these are not concrete rules, and other types of memory may be used for the LRAM 125 and the BRAM 120. In some example embodiments, the BRAM 120 has a greater storage capacity than the LRAM 125 and is optimized for area and the LRAM 125 is optimized for latency. In further example embodiments, the LRAM 125 stores a working set of sums of partial products for matrix multiplications.

The FPGA tile 100 receives a clock input to control the rate at which operations are performed. A frequency multiplier (e.g., a 2× multiplier) may be applied to the input clock frequency to change the operation rate. In some example embodiments, running the FPGA tile 100 at twice the clock rate allows twice as many calculations to be performed by using the MAC 130 or the MAC 135 twice in a single (external) clock cycle. For example, in a 128-bit input mode, sufficient inputs may be provided to perform four calculations per clock cycle but the MAC hardware is sufficient to perform only two. Accordingly, by performing two calculations on each of two internal clock cycles, four calculations are performed on the single external clock cycle, allowing the FPGA tile 100 to perform as effectively as an alternative design comprising twice as many MACs.

As another example of an advantage of using a frequency multiplier, operations that reuse at least some of the input operands may be performed more efficiently. For example, when weights or coefficients from the routing 105 are the same for multiple operations, other coefficients may be updated using the higher-frequency internal clock (e.g., read from the BRAM 120) and the multiple operations performed within a single external clock cycle. One practical use of this advantage is in machine learning, with a batch size equal to the clock multiplier (e.g., 2). The results of the multiple operations may be accumulated together to generate a single output to the routing 105 per external clock cycle, output in parallel to the routing 105 if there are sufficient output pins, or stored in the BRAM 120.

As can be seen in FIG. 1, the operand cascade output 160 is configured to provide any one of: data received via the routing 105, data received at the operand cascade input 145, the result from the MAC 130, and the result from the MAC 135. Thus, when multiple FPGA tiles 100 are connected by connecting the operand cascade output 160 of one tile to the operand cascade input 145 of the next tile, a single input from the routing 105 can be transmitted via the cascade connections to the remaining FPGA tiles 100. By comparison to existing methods in which routing 105 resources would be used for each of the multiple FPGA tiles 100, substantial routing resources are saved. As a practical matter, provision of the same operand to multiple MLPs 115 is useful in performing matrix multiplication operations, particularly for machine learning applications.

Similarly, the memory cascade output 165 is configured to provide any one of: data received via the routing 110, data received at the memory cascade input 155, and data read from the memory 140. Additionally, the memory cascade connections are bidirectional. Accordingly, while the two cascade connections are labeled as "input" and "output," data may flow in either direction. Thus, an address may be propagated in one direction through multiple FPGA tiles 100 via the cascade connections and a data result may be propagated in the other direction. As with the MLP 115, using cascade connections for the BRAM 120 saves routing resources.

By providing multiple input paths to the tile 100, some operations are enabled to be performed simultaneously that had to be performed serially in prior art designs. For example, an address input may be provided using the routing 105 or 110. The MAC 130 or the MAC 135 may use the address to retrieve first data from the memory 140 and perform an operation on the first data. Simultaneously, a second address input and second data may be provided using the memory cascade input 155. The memory 140 stores the second data at the second address while the MAC 130 or the MAC 135 is accessing the first data. Thus, the next working set of data is loaded into the BRAM while the MAC 130 or the MAC 135 is operating on the current working set of data. This enables greater throughput by comparison to tiles that can receive only a single address at a time and must pause the accessing of data for computation to load in new data.

Figure 2:
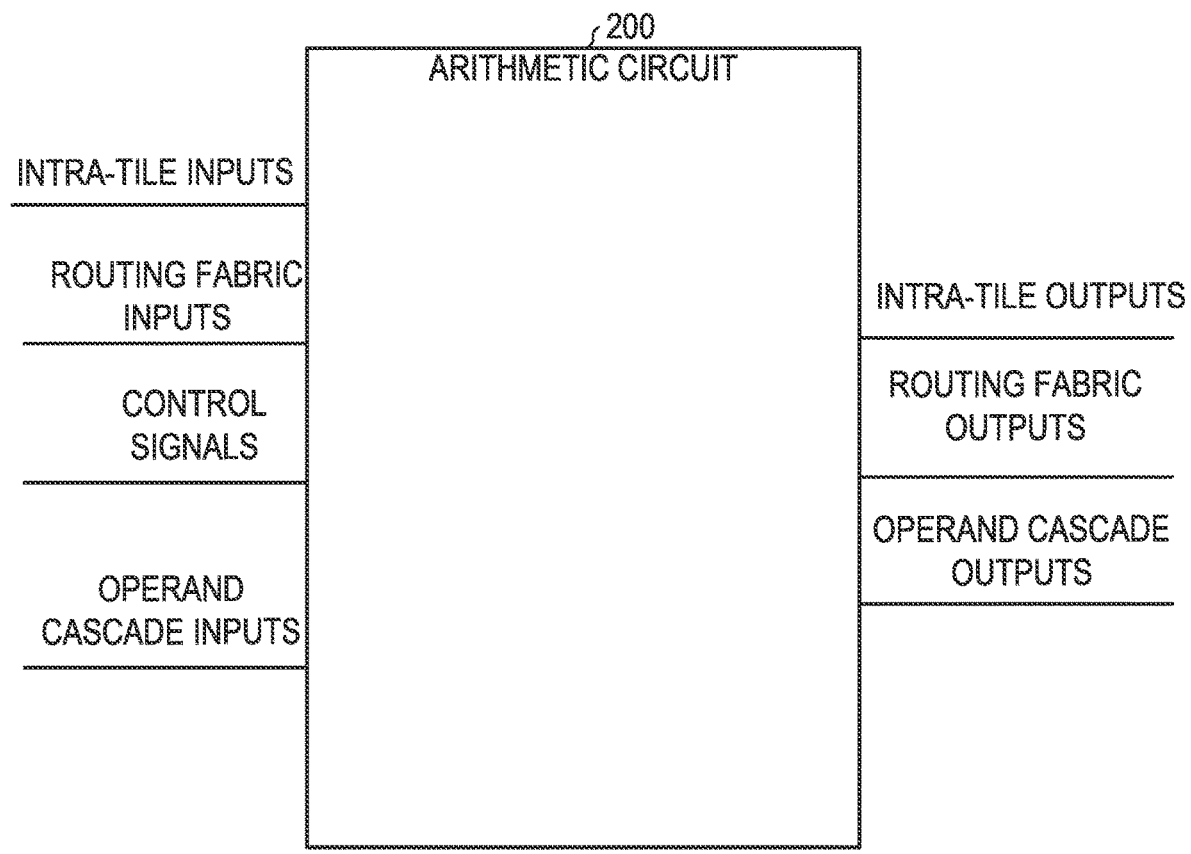
FIG. 2 is a high-level diagrammatic view of an arithmetic circuit that receives cascade inputs and provides cascade outputs, according to some example embodiments.

FIG. 2 is a high-level diagrammatic view of an arithmetic circuit 200 that receives cascade inputs and provides cascade outputs, according to some example embodiments. In some example embodiments, the arithmetic circuit 200 is the MLP 115. The arithmetic circuit 200 receives intra-tile inputs from the memory portion of the FPGA tile, routing fabric inputs from a routing fabric of the FPGA, control signals from the routing fabric of the FPGA, and operand cascade inputs from another FPGA tile without making use of the routing fabric. In various example embodiments, more or fewer inputs are present.

The arithmetic circuit 200 provides intra-tile outputs to the memory portion of the FPGA tile, routing fabric outputs to the routing fabric of the FPGA and operand cascade outputs to another FPGA tile without making use of the routing fabric. In various example embodiments, more or fewer outputs are present. Typically, the operand cascade inputs are received from a first FPGA tile, the arithmetic circuit 200 is part of a second FPGA tile, and the operand cascade outputs are provided to a third FPGA tile.

Figure 3:
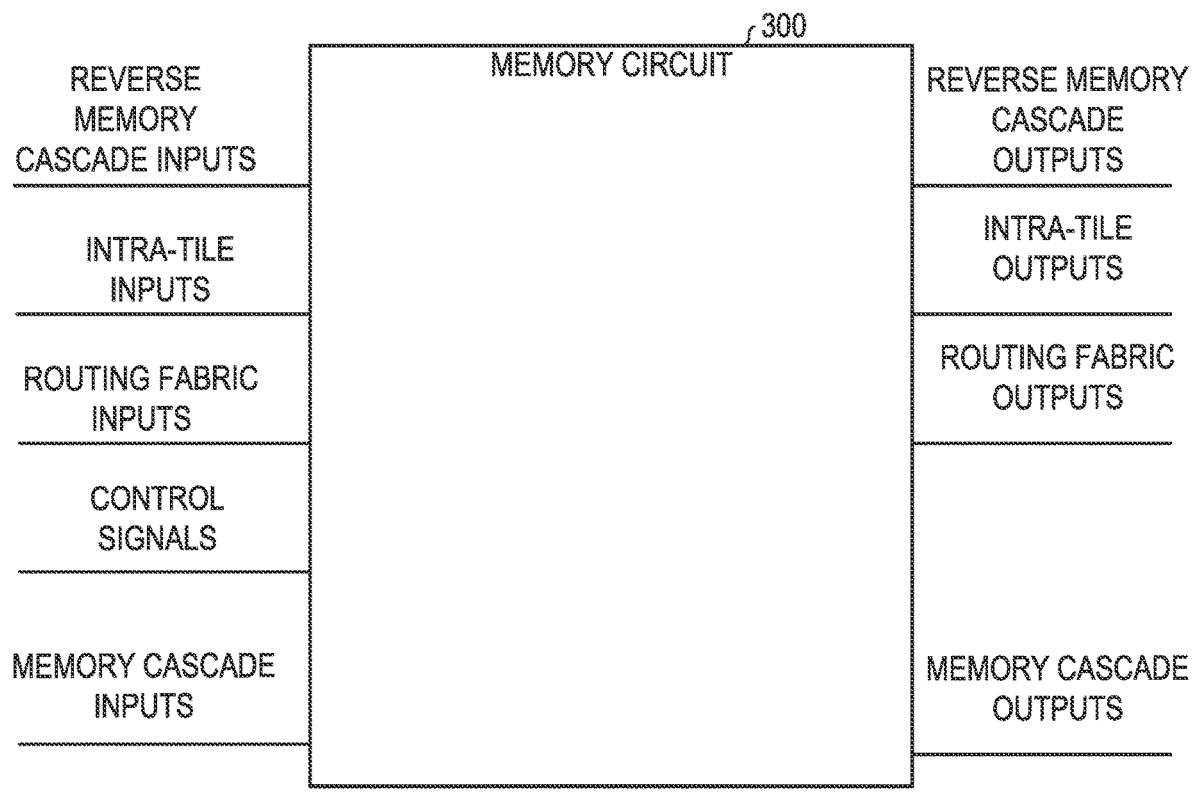
FIG. 3 is a high-level diagrammatic view of a memory circuit that receives cascade inputs and provides cascade outputs, according to some example embodiments.

FIG. 3 is a high-level diagrammatic view of a memory circuit 300 that receives cascade inputs and provides cascade outputs, according to some example embodiments. In some example embodiments, the memory circuit 300 is the BRAM 120. The memory circuit 300 receives intra-tile inputs from the arithmetic portion of the FPGA tile, routing fabric inputs from a routing fabric of the FPGA, control signals from the routing fabric of the FPGA, memory cascade inputs from a first FPGA tile, and reverse memory cascade inputs from a second FPGA tile. The cascade inputs do not make use of the routing fabric. The memory cascade inputs may comprise control signals as well as data signals. In various example embodiments, more or fewer inputs are present.

The memory circuit 300 provides intra-tile outputs to the arithmetic portion of the FPGA tile, routing fabric outputs to the routing fabric of the FPGA, memory cascade outputs to the second FPGA tile, and reverse memory cascade outputs to the first FPGA tile. In various example embodiments, more or fewer outputs are present.

Figure 4:
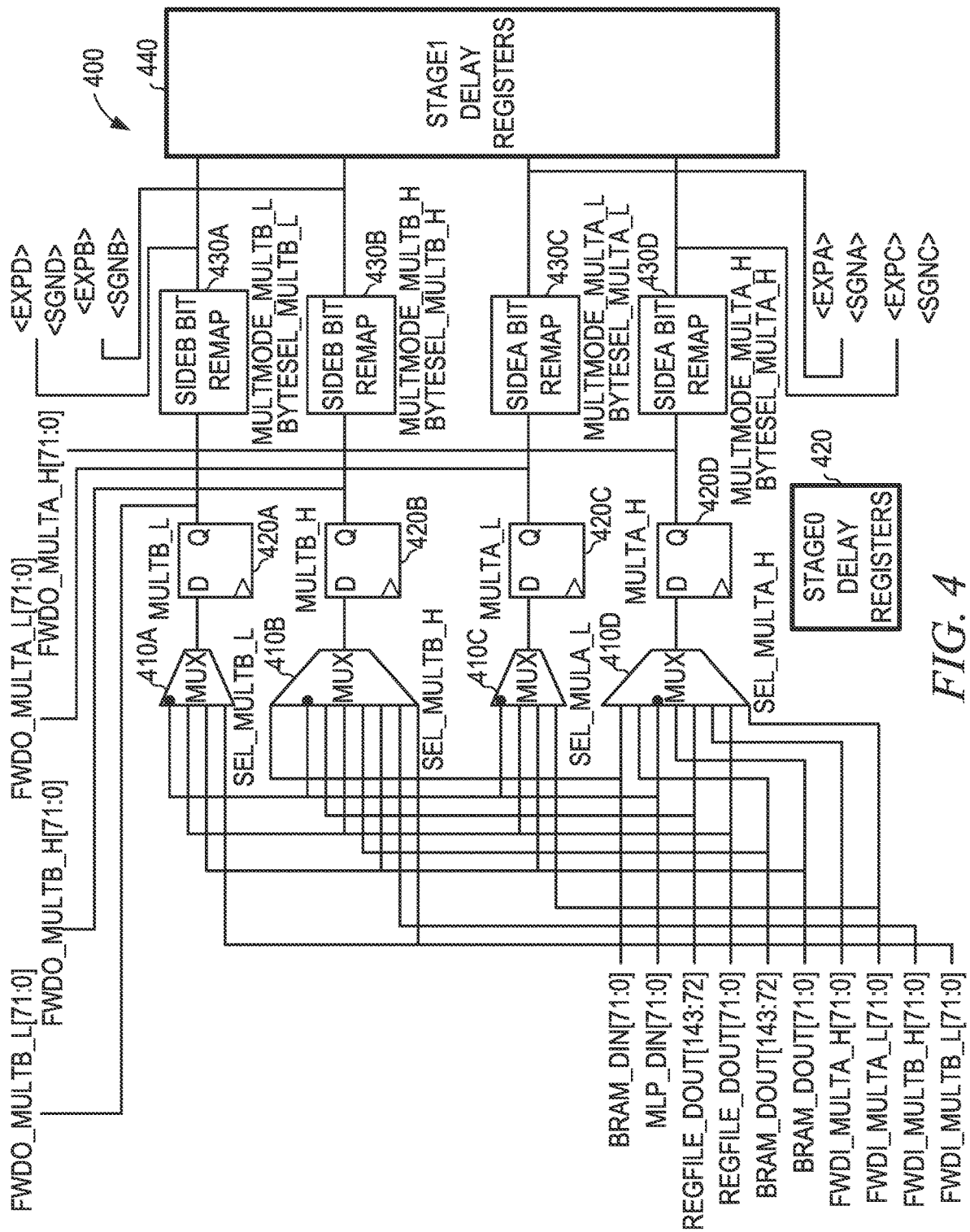
FIG. 4 is a diagrammatic view of a portion of an arithmetic circuit that uses cascade communications between FPGA tiles, according to some example embodiments.

FIG. 4 is a diagrammatic view of a portion 400 of an arithmetic circuit that uses cascade communications between FPGA tiles, according to some example embodiments. The portion 400 comprises multiplexers 410A, 410B, 410C, and 410D; registers 420A, 420B, 420C, and 420D, referred to collectively as stage 0 delay registers 420; bit remap logic 430A, 430B, 430C, and 430D; and stage 1 delay registers 440 (shown in more detail as individual registers 510A, 510B, 510C, 510D, 510E, 510F, 510G, 510H, 510I, 510J, 510K, 510L, 510M, 510N, 510O, and 510P in FIG. 5). The portion 400 accepts inputs for two multiply operands, A and B, remaps the operands to a format used by the next portion of the arithmetic circuit, and provides the remapped operands to delay registers used by the next portion.

The multiplexer 410A selects the low bits for the B operand from four options: MLP_DIN[71:0], 72 bits of data received via the routing fabric 105; REGFILE_DOUT[71:0], 72 bits of data received from the LRAM 125 within the tile 100; BRAM_DOUT[71:0], 72 bits of data received from the BRAM 120 within the tile 100; and FWDI_MULTB_L[71:0], 72 bits of data received from the operand cascade input 145. The multiplexer 410B selects the high bits for the B operand from eight options: BRAM_DIN[71:0], 72 bits of data received via the routing fabric 110; REGFILE_DOUT[143:72], 72 bits of data received from the LRAM 125 within the tile 100; BRAM_DOUT[143:72], 72 bits of data received from the BRAM 120 within the tile 100; MLP_DIN[71:0]; REGFILE_DOUT[71:0], BRAM_DOUT[71:0]; and FWDI_MULTB_L[71:0]. Thus, the B operand is generated from a combination of inputs from one or more of the routing fabric 105, the routing fabric 110, the LRAM 125, the BRAM 120, and the operand cascade input 145.

The low bits for the A operand are selected by the multiplexer 410C from four options: MLP_DFN[71:0]; REGFILE_DOUT[71:0]; BRAM_DOUT[71:0]; and FWDI_MULTA_L[71:0], 72 bits of data received from the operand cascade input 145. The high bits for the A operand are selected by the multiplexer 410D from eight options: BRAM_DIN[71:0]; MLP_DIN[71:0]; REGFILE_DOUT[143:72]; REGFILE_DOUT[71:0]; FWDI_MULTA_L[71:0]; BRAM_DOUT[143:72]; BRAM_DOUT[71:0]; and FWDI_MULTA_H[71:0], 72 bits of data received from the operand cascade input 145. Thus, the A operand is also generated from a combination of inputs from one or more of the routing fabric 105, the routing fabric 110, the LRAM 125, the BRAM 120, and the operand cascade input 145.

The inputs selected by the multiplexers 410A-410D are optionally stored in the corresponding one of the registers 420A-420D, which provide data to the operand cascade output 160 in the form of FWDO_MULTB_L[71:0], the low bits of the B operand; FWDO_MULTIB_H[71:0], the high bits of the B operand; FWDO_MULTA_L[71.0], the low bits of the A operand; and FWDO_MULTA_H[71:0], the high bits of the A operand. Additionally, each of the registers 420A-420D is accessed by the corresponding one of the bit remap logics 430A-430D. Each of the bit remap logics 430A-430D remaps the inputs based on a multiplication mode and byte selection mode input. Exponent and sign bits are output from the bit remap logics 430A-430D as signals <EXPA>, <SGNA>, <EXPB>, <SGNB>, <EXPC>, <SGNC>, <EXPD>, and <SGND>. The remapped inputs are provided to the stage 1 delay registers 440, for access by the next portion of the arithmetic circuit.

The inputs selected by the multiplexers 410A-410D are controlled by configuration signals SEL_MULTB_L, SEL_MULTB_H, SEL_MULTA_L, and SEL_MULTA_H. Thus, the arithmetic circuit is configured by one or more configuration signals to receive inputs from a first connection fabric, a second connection fabric, a first fused memory, a second fused memory, an operand cascade input, or any suitable combination thereof. As an example, in response to a first configuration signal, the arithmetic circuit is configured to perform operations on data received via a routing fabric (e.g., MLP_DIN[71:0], a possible selection by each of the multiplexers 410A-410D) and data received within a tile of an FPGA from a first memory (e.g., BRAM_DOUT[143:72], a possible selection by the multiplexers 410B and 410D or BRAM_DOUT[71:0], a possible selection by the multiplexers 410A and 410C). As another example, in response to a second configuration signal, the arithmetic circuit is configured to perform operations on data received via the routing fabric and data received within a tile of the FPGA from a second memory (e.g., REGFILE_DOUT[143:72], a possible selection by the multiplexers 410B and 410D or REGFILE_DOUT[71:0], a possible selection by the multiplexers 410A and 410C).

In a floating-point mode that differs from the floating-point format used by the portion 500, the bit remap logics 430A-430D convert the inputs to a format expected by the portion 500. In an example, the portion 500 expects floating-point values with a 15-bit mantissa, a one-bit sign, and an 8-bit exponent. In this example, the multiple mode arithmetic circuit supports inputs and outputs using various combinations of 16-bit mantissas, 10-bit mantissas, 12-bit mantissas, 8-bit exponents, 6-bit exponents, and 5-bit exponents. Based on the input format and the format expected by the portion 500, the bit remap logics 430A-430D convert the input values. In this example, selection of the input floating-point format is in response to a mode selection input.

The bit remap logics 430A-430D, in some example embodiments, perform sign extension. As a result, operands that are smaller than the size of the input values accepted by the arithmetic blocks (e.g., the multipliers 520A-520H) are routed using only the routing resources necessary for the operands and sign-extended by the bit remap logics 430A-430D prior to use by the arithmetic blocks. By comparison with designs that perform sign extension prior to routing, this design saves routing resources.

The integer arithmetic logic blocks may be used to perform floating-point operations on the mantissas of floating-point operands by identifying the highest exponent among the exponents of the floating-point operands and right-shifting the mantissas of the other operands by the difference in exponents. For example, consider the table below, showing four operands.

| Original Mantissa | Original Exponent | Adjusted Mantissa | Adjusted Exponent |
|---|---|---|---|
| 10101010 | 0001 | 11110101 | 0100 |
| 11110000 | 0010 | 11111100 | 0100 |
| 00110011 | 0011 | 00011001 | 0100 |
| 00001111 | 0100 | 00001111 | 0100 |

After the adjustment, the mantissas of the operands can be manipulated as integers, since all exponents are equal. This floating-point mode is referred to as block floating-point since in all of the numbers being operated on are grouped together (in a "block") with a common exponent value.

In the example above, note that the first two operands have their mantissas padded with is and the last two operands have their mantissas padded with 0s. This is consistent with 2's complement representation of negative numbers. In an unsigned mode or a signed/magnitude mode, the manipulation of the mantissa changes accordingly either by padding with 0s (for unsigned) or inserting 0s without modifying the sign bit (sign/magnitude).

Figure 5:
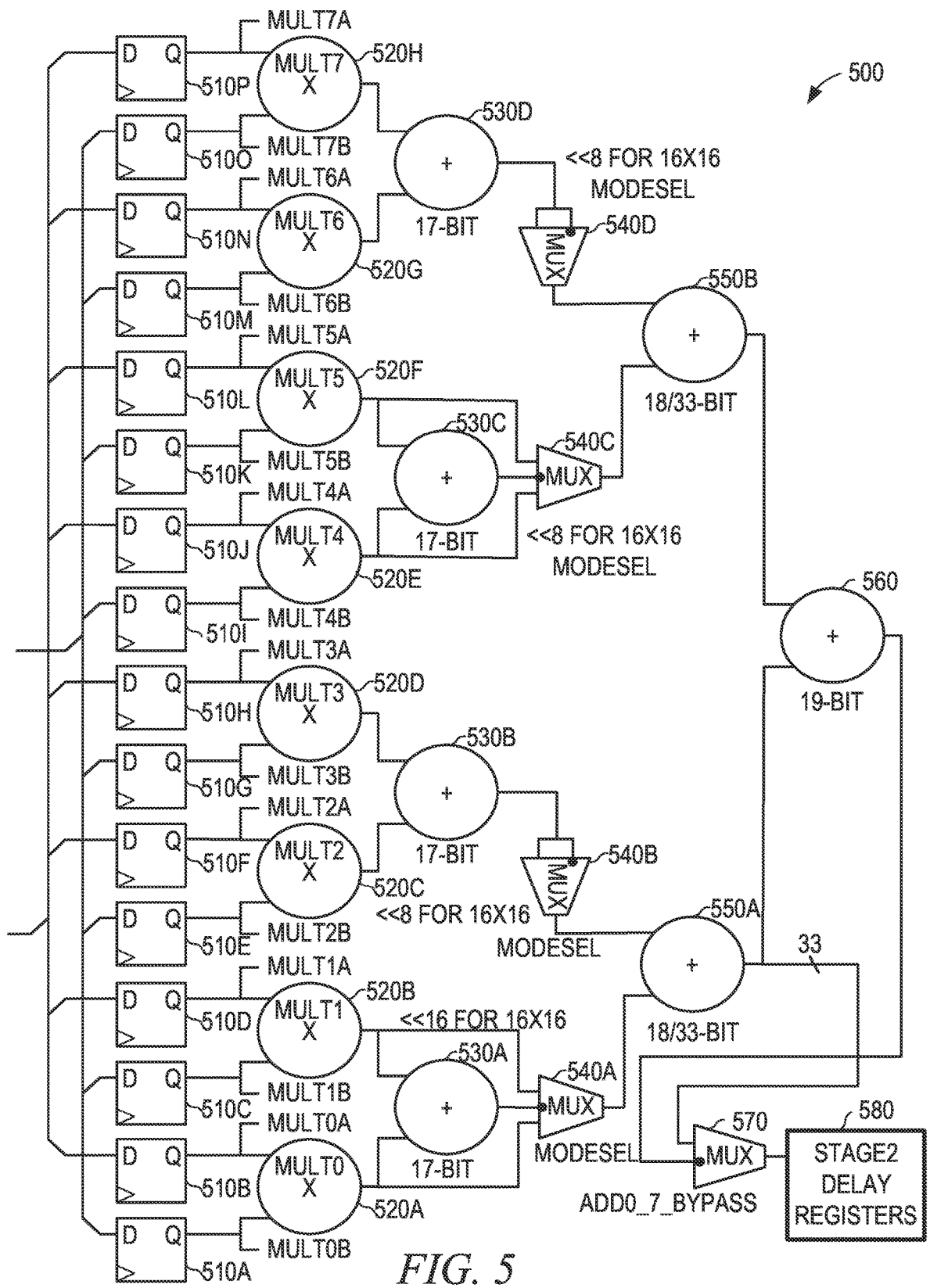
FIG. 5 is a diagrammatic view of a portion of an arithmetic circuit that uses cascade communications between FPGA tiles, according to some example embodiments.

FIG. 5 is a diagrammatic view of a portion 500 of an arithmetic circuit that uses cascade communications between FPGA tiles, according to some example embodiments. The portion 500 comprises registers 510A, 510B, 510C, 510D, 510E, 510F, 510G, 510H, 510I, 510J, 510K, 510L, 510M, 510N, 510O, and 510P; multipliers 520A, 520B, 520C, 520D, 520E, 520F, 520G, and 520H; adders 530A, 530B, 530C, 530D, 550A, 550B, and 560; multiplexers 540A, 540B, 540C, 540D, and 570; and stage 2 delay registers 580.

Each of the registers 510A-510P stores eight bits of data for an operand for one of the multipliers 520A-520H. Each of the multipliers 520A-520H accepts eight bits of the A operand and eight bits of the B operand. Thus, the portion 500, in total, handles 64 bits of the A operand and 64 bits of the B operand. To handle the complete input received by the portion 400, the portion 500 is duplicated, with each instance of the portion 500 handling half of the inputs.

In a first operation mode, the portion 500 is configured to determine a sum of eight 8-bit multiply operations. By sign-extending or padding with leading zeros, as appropriate, the sum of fewer multiply operations or the sum of eight smaller (e.g., 6-bit or 4-bit) operations may be determined in the first operation mode. In a first variation of the first operation mode, each of the multipliers 520A-520H is an eight-bit multiplier that is configured to output the sum of two four-bit multiplies. In a second variation of the first operation mode, each of the multipliers 520A-520H is an eight-bit multiplier that is configured to output the result of two four-bit multiplies. In a second operation mode, the portion 500 is configured to output a sum of two 16-bit multiply operations. By sign-extending or padding with leading zeros, as appropriate, a single multiply operation or the sum of two smaller (e.g., 12-bit or 10-bit) operations may be determined in the second operation mode. In a third operation mode, the portion 500 in combination with the second instance of the portion 500 is configured, using an additional shifter and a wider adder, to determine a single 32-bit multiply operation. By sign-extending or padding with leading zeros, as appropriate, a smaller multiply operation (e.g., 18-bit or 24-bit) may be determined in the third operation mode. In additional operation modes, one or more individual multiply results may be provided at the output, in addition to or instead of the sum of the multiply operations.

With respect to the first operation mode, each of the eight multipliers 520A-520H performs an eight-bit multiplication using a different portion of the operands A and B as inputs. The results of the eight multiplications are pairwise summed by the adders 530A-530D. The four addition results are pairwise summed by the adders 550A-550B, using the multiplexers 540A-540D (controlled by a MODELSEL signal) to determine whether to take the addition result directly or shifted as shown. The shifted results are used to support 16-bit multiplication. The two results of the adders 550A-550B are summed by the adder 560. The result of the adder 560 is the sum of the eight eight-bit multiplications, and is provided, via the mux 570, to the stage 2 delay registers 580.

With respect to the second operation mode, the multipliers 520A-520D together, in combination with the adders 530A, 530B, and 550A, determine a first 16-bit multiplication result. The multipliers 520E-520H, in combination with the adders 530C, 530D, and 550B, determine a second 16-bit multiplication result. Four multipliers of a first operand size can be used to generate multiplication results of a second operand size that is twice the first operand size. The larger operands are divided into two portions, high and low, and organized as follows, wherein AH represents the high portion of the A operand, AL represents the low portion of the A operand, BH represents the high portion of the B operand, and BL represents the low portion of the B operand. AH AL×BH BL=AL×BL+AH×BL<<SIZE+BH×AL<<SIZE+AH×BH<<2×SIZE. Since doubling the size of the operand uses four multipliers of the original size to perform one multiplication at the larger size, the number of operations performed by the arithmetic circuit is reduced (in this case by a factor of four) when the size of the operands is increased (in this case by a factor of two). Each of the four component multiplication results is a partial product. The partial product results are summed to generate the final multiplication result.

Thus, in the second operation mode, the multiplier 520D multiplies BL with AH and the multiplier 520C multiplies BH with AL. The results are added by the adder 530B and the result from the adder 530B is shifted left eight bits. The multiplier 520B multiplies BH with AH and the result is shifted left sixteen bits. The multiplier 520A multiples BL with AL. Following the results through the adders 530A and 550A, the output of the adder 550A is the result of the 16-bit multiply operation. The multipliers 520E-520H and adders 530C, 530D, and 550B are similarly configured to process a second 16-bit multiply operation. The results of the two operations are summed by the adder 560 and provided to the stage 2 delay registers 580 via the multiplexer 570.

In some example embodiments, the portion 500 performs only a single 16-bit multiply in the second operation mode. In these embodiments, the results generated by the multipliers 520E-520H and the adders 530C, 530D, 550B, and 560 are ignored. Instead, the multiplexer 570 is configured to provide the output from the adder 550A, containing the single 16-bit multiply result, to the stage 2 delay registers 580.

In the third operation mode, the four 16-bit multiply operations provided by two instances of the portion 500 are combined in a manner analogous to that described with respect to the second operation mode, using an additional shifter and a wider adder, resulting in a circuit that determines a single 32-bit multiplication, making use of the adder 630 discussed below with respect to FIG. 6.

Though the portion 500 is described as performing multiplication operations on the selected inputs and then summing the result of the multiplication operations, other configurations of the arithmetic circuit are contemplated. For example, the inputs from the registers 510A-510P may be provided to the multipliers 520A-520H as shown and also be provided to a set of adders. Using a multiplexer for each multiplier/adder pair, the input to the adders 530A-530D is selected either as the multiplication result or the addition result. Thus, based on a configuration signal controlling the multiplexers, the arithmetic circuit either determines a sum of the input operands or the sum of products of the input operands (as shown in FIG. 5).

Figure 6:
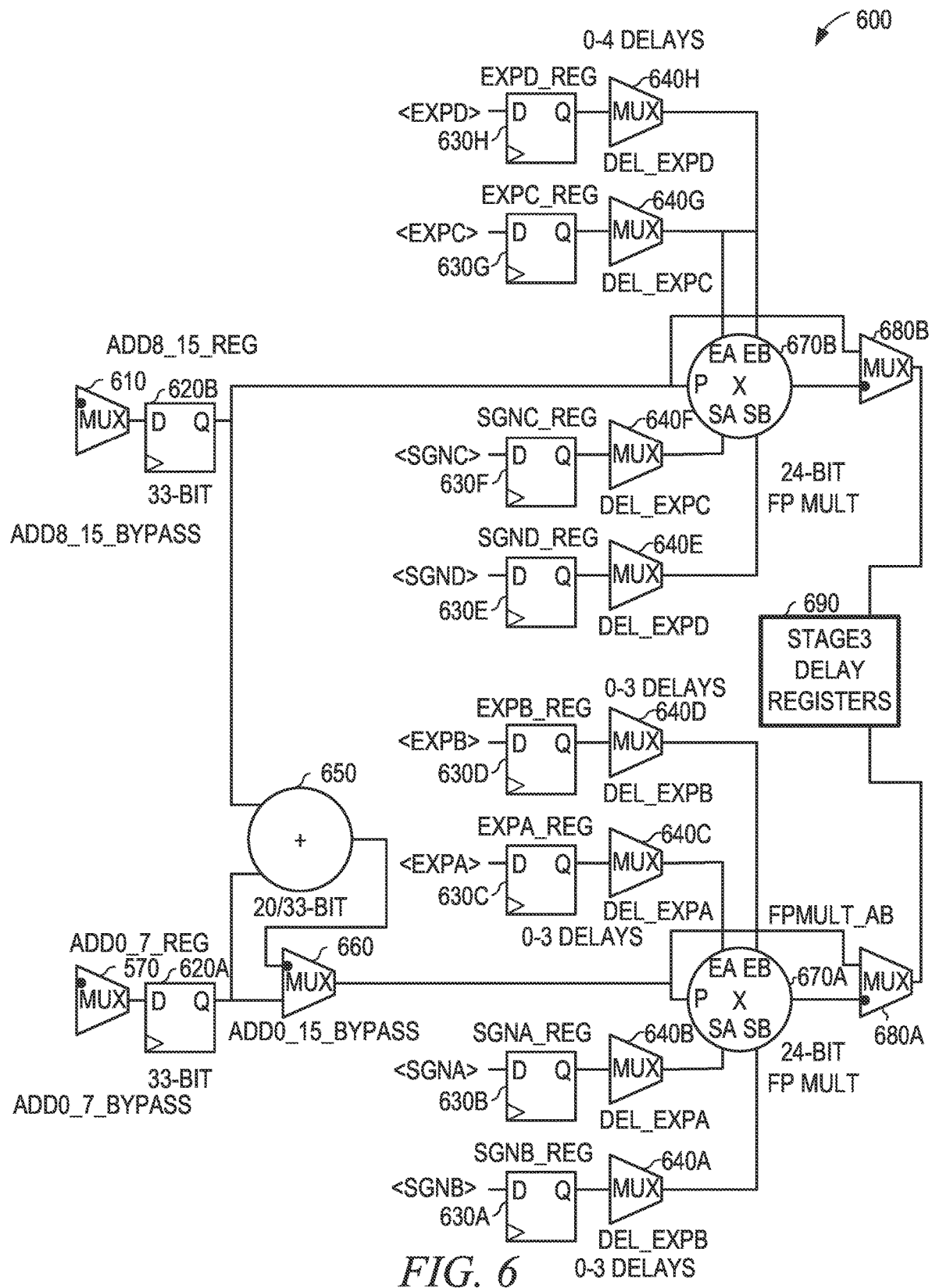
FIG. 6 is a diagrammatic view of a portion of an arithmetic circuit that uses cascade communications between FPGA tiles, according to some example embodiments.

FIG. 6 is a diagrammatic view of a portion 600 of an arithmetic circuit that uses cascade communications between FPGA tiles, according to some example embodiments. The portion 600 comprises the multiplexer 570 of FIG. 5 and the corresponding multiplexer 610 from a duplicate of the portion 500 that handles the high half of the inputs A and B. The outputs of the multiplexers 570 and 610 are provided to the stage 2 delay registers 620A and 620B, each 34 bits wide. Inputs to the portion 600 are also received from the stage 1 delay registers 630A, 630B, 630C, 630D, 630E, 630F, 630G, and 630H, storing the <SGNA>, <SGNB>, <SGNC>, <SGND>, <EXPA>, <EXPB>, <EXPC>, and <EXPD> values generated by the bit remap logics 430A-430D of FIG. 4. The portion 600 further includes an adder 650; multiplexers 640A, 640B, 640C, 640D, 640E, 640F, 640G, 640H, 660, 680A, and 680B; multipliers 670A and 670B; and stage 3 delay registers 690.

The results from the portion 500 and its duplicate are added by the adder 650. The multiplexer 660 selects either the results from the portion 500 or the summed results from both portions, based on a value of an ADD0_15_BYPASS signal, and provides the selected result to the multiplier 670A and the multiplexer 680A. Based on the <EXPA>, <EXPB>, <SGNA>, and <SGNB> values received via the multiplexers 640A-640D and the value received from the multiplexer 660, the multiplier 670A generates a 24-bit floating-point multiplication result. Similarly, based on the <EXPC>, <EXPD>, <SGNC>, and <SGND> values received via the multiplexers 640E-640H and the result received from the register 620B, the multiplier 670B generates a second 24-bit floating-point multiplication result. Based on an FPMULT_AB signal, the multiplexers 680A-680B output either the 24-bit floating-point results generated by the multipliers 670A-670B or pass through the results provided by the register 620B and the multiplexer 660. The outputs of the multiplexers 680A-680B are provided to the stage 3 delay registers 690.

Thus, in one operation mode, the outputs of the multiplexers 680A-680B of the portion 600 are the outputs of the portion 500 and its duplicate portion, bypassing the adder 650 and the multipliers 670A-670B. In a second operation mode, the output of the multiplexer 680A is the sum of all multiplies performed by the portion 500 and its duplicate, and the output of the multiplexer 680B is the sum of the multiplies performed by the duplicate of the portion 500. In a third operation mode, the output of the multiplexers 680A-680B are 24-bit floating-point versions of the outputs of the portion 500 and its duplicate portion. In a fourth operation mode, the output of the multiplexer 680A is a 24-bit floating-point representation of the sum of all multiplies performed by the portion 500 and its duplicate, and the output of the multiplexer 680B is a 24-bit floating-point representation of the sum of the multiplies performed by the duplicate of the portion 500.

Figure 7:
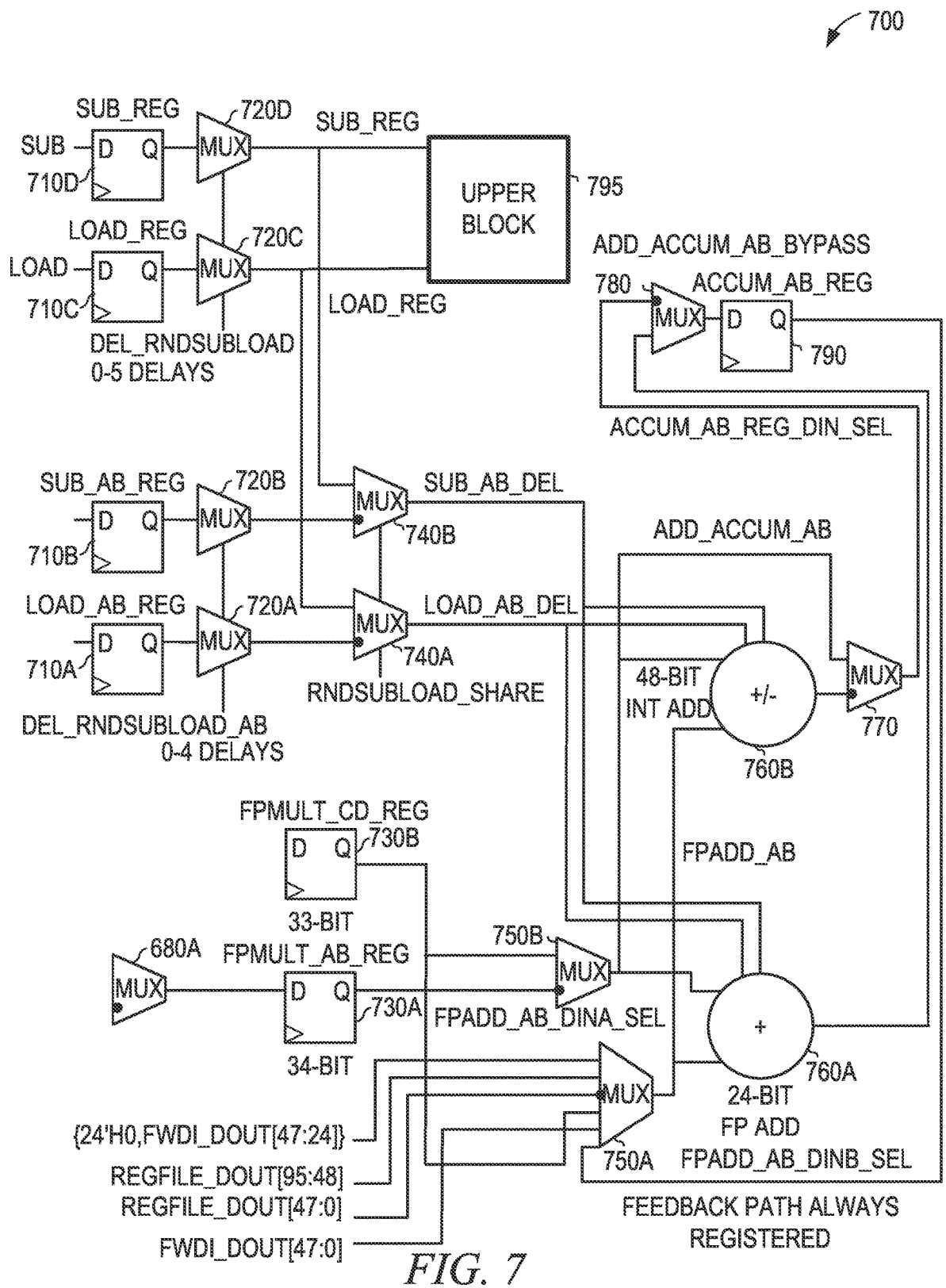
FIG. 7 is a diagrammatic view of a portion of an arithmetic circuit that uses cascade communications between FPGA tiles, according to some example embodiments.

FIG. 7 is a diagrammatic view of a portion 700 of an arithmetic circuit that uses cascade communications between FPGA tiles, according to some example embodiments. The portion 700 includes the multiplexer 680A of FIG. 6; stage 1 delay registers 710A, 710B, 710C, and 710D; multiplexers 720A, 720B, 720C, 720D, 740A, 740B, 750A, 750B, 770, and 780; stage 3 delay registers 730A and 730B; adders 760A and 760B; stage 4 delay register 790. Connections between the portion 700 and upper block 795 are also shown in FIG. 7. The upper block 795 refers to the portion of the arithmetic circuit shown in FIG. 8.

The output of the multiplexer 680A is stored in the stage 3 delay register 730A. The stage 3 delay register 730B stores either the output of the multiplexer 660B of FIG. 6 or an addition result generated by adding the output of the multiplexer 660B to FWDI_DOUT[47:0], as described below with respect to FIG. 8.

The multiplexer 750A selects a value from FWDI_DOUT [47:0], REGFILE_DOUT[47:0], 48 bits from the LRAM 125; REGFILE_DOUT[95:48], a different 48 bits from the LRAM 125; delay register 730B; and {24'H0, FWDI_D-OUT[47:24]}, 24 0 bits prepended to 24 bits of the operand cascade input. The multiplexer 750B selects a value from the stage 3 delay registers 730A and 730B. The outputs of the multiplexers 750A and 750B are provided to the adder 760A and the adder 760B. Based on the SUB_AB_DEL and LOAD_AB_DEL signals received from the multiplexers 740A and 740B and the selected values received from the multiplexers 750A and 750B, the adder 760A generates an addition result. Based on the SUB_AB_DEL and LOAD_AB_DEL signals received from the multiplexers 740A and 740B and the selected values received from the multiplexers 750A and 750B, the adder 760B generates an addition result or a subtraction result. The SUB signals control whether the adders 760A and 760B generate addition or subtraction results. The LOAD signals control whether the adders 760A and 760B add the input value to the accumulated value or ignore the accumulated value and merely load the input value, providing the input value as the output and setting the accumulator value to the input value. The DEL signals have a delay of 0-4 cycles.

The bypass multiplexer 770 selects either the result generated by the adder 760B or the result of the multiplexer 750B. Thus, bypass multiplexer 770 provides either an addition result from the portion 700 or either result from FIG. 6. The multiplexer 780 selects either the output of the multiplexer 770 or the output of the adder 760A and provides the result to the stage 4 delay register 790.

Figure 8:
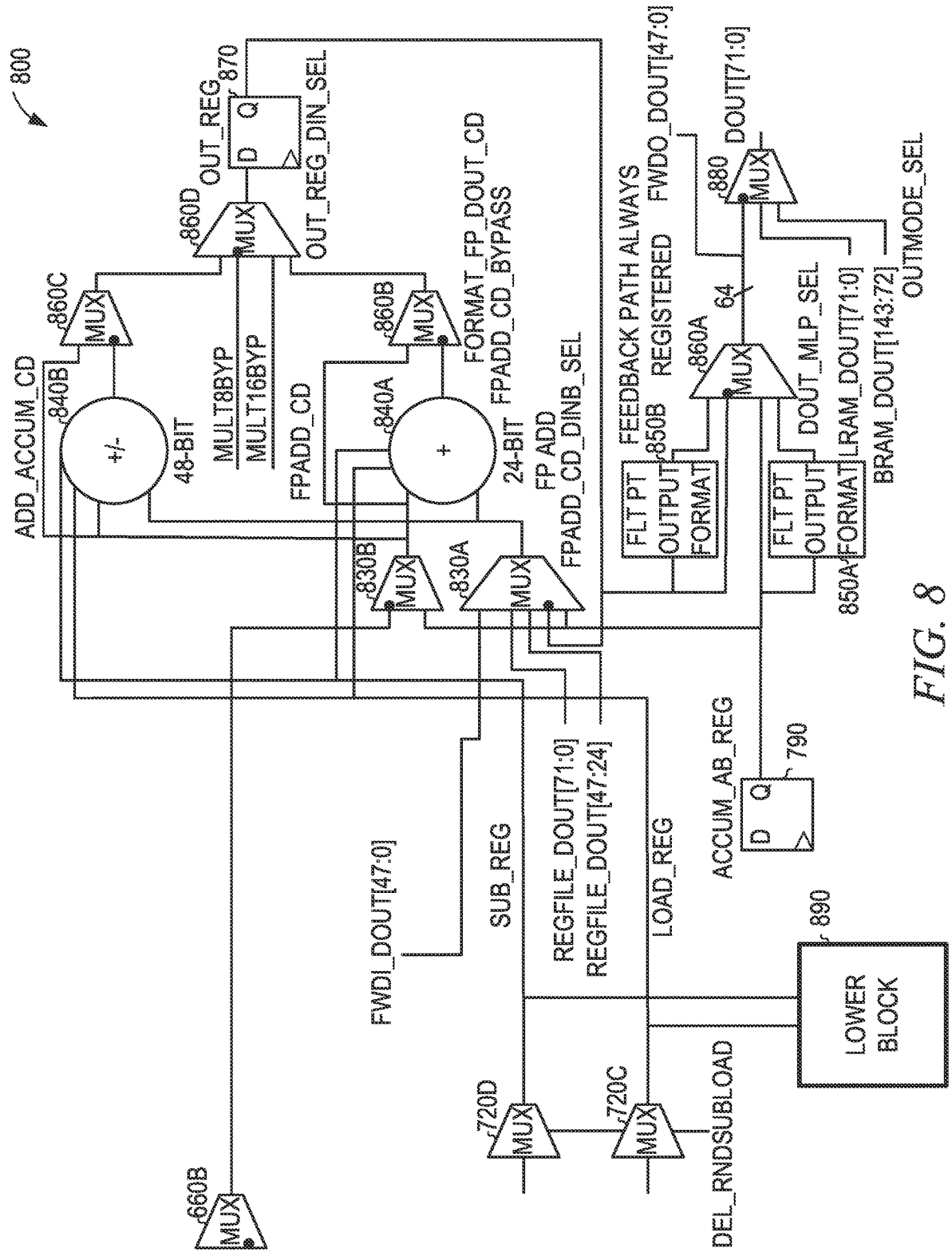
FIG. 8 is a diagrammatic view of a portion of an arithmetic circuit that uses cascade communications between FPGA tiles, according to some example embodiments.

FIG. 8 is a diagrammatic view of a portion 800 of an arithmetic circuit that uses cascade communications between FPGA tiles, according to some example embodiments. The portion 800 corresponds to the upper block 795 shown in FIG. 7. The portion 800 includes the multiplexer 660B of FIG. 6; the multiplexers 720C and 720D of FIG. 7; adders 840A and 840B; the stage 4 delay register 790; multiplexers 830A, 830B, 860A, 860B, 860C, 860D, and 880; logic blocks 850A and 850B; and output register 870. The portion 700 of FIG. 7 is represented in FIG. 8 as lower block 890.

The multiplexer 830A selects a value from FWDI_DOUT[47:0]; REGFILE_DOUT[71:0]; REGFILE_DOUT[47:24], 24 bits from the LRAM 125; and value from the output register 870, received via a feedback path. The multiplexer 830B selects either the value from the multiplexer 660B or the value from the stage 4 delay register 790.

The adder 840A sums the outputs from the multiplexers 830A and 830B, as modified by the SUB_REG and LOAD_REG signals. The SUB signals control whether the adder 840A generates addition or subtraction results. The LOAD signals control whether the adder 840A adds the input value to the accumulated value or ignores the accumulated value and merely loads the input value, providing the input value as the output and setting the accumulator value to the input value. As SUB_REG and LOAD_REG are not DEL signals, there is no delay in handling the inputs. The adder 840B adds the outputs from the multiplexers 830A-830B or takes the difference, depending on the SUB_REG signal. The multiplexers 860B and 860C select either the outputs of the adders 840A-840B or, based on an FPADD_CD_BYPASS signal, provide the output from the multiplexer 830B. The multiplexer 860D selects an output from the multiplexer 860B, the multiplexer 860C, a MULT8BYP input, and a MULT16BYP input. If a bypass signal is used, the MULT8BYP signal is selected when the circuit is configured to perform 8-bit operations, and the MULT16BYP signal is selected when the circuit is configured to perform 16-bit operations.

The output of the multiplexer 860D is stored in the output register 870. If the circuit is configured to perform a floating-point format conversion (e.g., from an internal 24-bit floating-point format to a 16-bit output floating-point format), the value in the output register 870 is processed by the logic block 850B before being provided as an input to the multiplexer 860A. Likewise, if the circuit is configured to perform the floating-point format conversion, the value in the stage 4 delay register 790 is processed by the logic block 850A. The multiplexer 860A selects an input from the processed and unprocessed values of the registers 790 and 870. The output of the multiplexer 860A is provided as FWDO_DOUT[47:0], a 48-bit operand cascade output.

In a floating-point mode that differs from the floating-point format used by the portions 500-700, the logics 850A-850B convert the intermediate outputs to a format expected by the FPGA. In an example, the portions 500-700 operates on floating-point values with 16-bit mantissas and 8-bit exponents. In this example, the multiple mode arithmetic circuit supports inputs and outputs using various combinations of 16-bit mantissas, 10-bit mantissas, 12-bit mantissas, 8-bit exponents, 6-bit exponents, and 5-bit exponents. Based on the output format and the format operated on the portions 500-700, the logics 850A-850B convert the output values. In some example embodiments, the internal floating-point format used by the portions 500-700 has a mantissa size at least as large as the mantissa size of the input/output floating-point format.

Integer accumulators can be used for floating-point operations in special cases. In embodiments with both integer and floating-point accumulators, the integer accumulator may be wider than the floating-point accumulator, allowing block floating-point operations to use the integer accumulator without loss of data when the floating-point exponents are close in value.

The multiplexer 880 selects, based on an OUTPUT_SEL signal, the output value for the circuit from the output of the multiplexer 860A; LRAM_DOUT[71:0], a 72-bit value read from the LRAM 125; and BRAM_DOUT[143:72]. The selected output value is provided as DOUT[71:0], a 72-bit output provided to the routing fabric 105.

Figure 9:
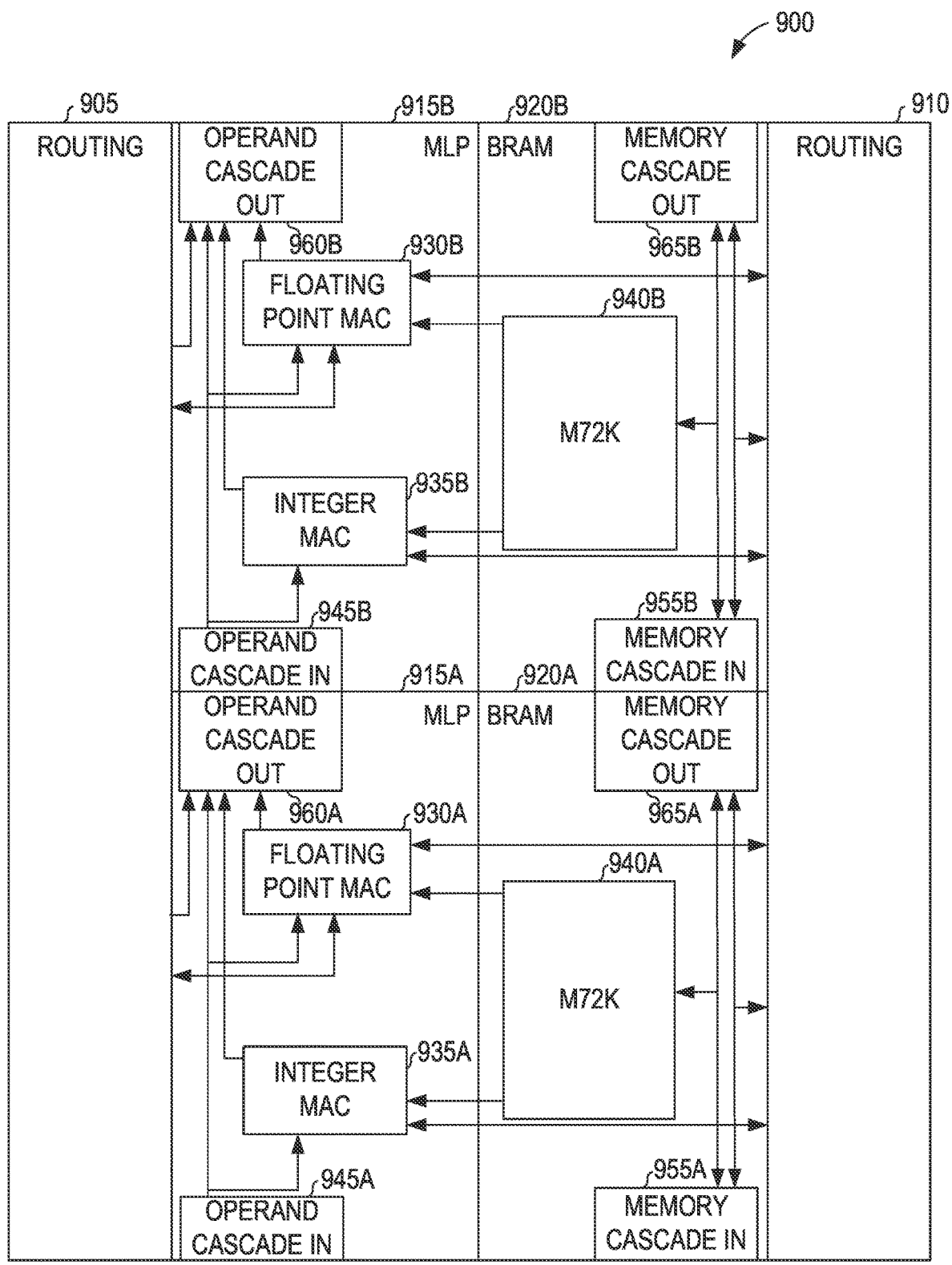
FIG. 9 is a high-level diagrammatic view showing connections between tiles of an FPGA using cascade communications, according to some example embodiments.

FIG. 9 is a high-level diagrammatic view 900 showing connections between tiles of an FPGA using cascade communications, according to some example embodiments. The connected routing 905 and 910 are also shown. A first tile includes an MLP 915A and a BRAM 920A. A second tile includes an MLP 915B and a BRAM 920B. Each tile may include an LRAM. The MLP 915A comprises a floating-point MAC 930A and an integer MAC 935A. The BRAM 920A comprises a memory 940A. The MLP 915B comprises a floating-point MAC 930B and an integer MAC 935B. The BRAM 920B comprises a memory 940B. The tiles are connected to other tiles via the routing 905 and the routing 910.

The operand cascade output 960A is connected directly to the operand cascade input 945B, allowing data to be communicated from the MLP 915A to the MLP 915B without using the routing 905. The memory cascade output 965A is connected directly to the memory cascade input 955B, allowing data to be communicated from the BRAM 920A to the BRAM 920B without using the routing 910. The operand cascade input 945A and the memory cascade input 955A allow the MLP 915A and the BRAM 920A to be connected to another FPGA tile. Similarly, the operand cascade output 960B and the memory cascade output 965B allow the MLP 915B and the BRAM 920B to be connected to another FPGA tile. The cascade connections may be unidirectional or bidirectional.

Though FIG. 9 shows only two tiles being connected via cascade connections, additional tiles are also connected in this manner in some example embodiments. Thus, any number of tiles may be connected using cascade connections. Each of the cascaded tiles may be configured to pass through the operands (e.g., to set the operand cascade output to the operand cascade input), to pass through the memory data in either direction (e.g., to set the memory cascade output to the memory cascade input or to set the memory cascade input to the memory cascade output), or both. Additionally or alternatively, each of the cascaded tiles may be configured to generate results using any combination of inputs from the routing 905, the routing 910, the operand cascade input 945, the memory cascade input 955, the memory cascade output 965, and the memory 940.

In some example embodiments, the operand cascade connections are used to share inputs across a number of MLPs. Thus, the system making use of the MLPs only uses the routing 905 to provide the inputs to a single MLP and the connected MLPs share the input values. This is useful in implementing larger multipliers or other arithmetic operators. For example, a multiplier that multiplies two 16-bit numbers may be formed from four 8-bit multipliers. If a single MLP provides a single 8-bit multiplier, four MLPs may be cascaded to generate the result by providing the operands to a single MLP that shares the data with the other MLPs via cascade connections. By comparison with an FPGA that uses traditional connections, half of the routing is saved, since only the 32 bits of input needed to define the operation are sent through the routing instead of sending 64 bits of input (16 bits of input to each of the four MLPs).

As another example of the use of cascade communications, the operand cascade connections are used to share outputs between MLPs. For example, each MLP may calculate a sum of partial products. When the user desires a sum of more partial products than can be determined by a single MLP (e.g., when performing a matrix multiply with a large number of elements), each MLP in a cascade can provide its summation output to the next MLP. The next MLP determines the sum of its own partial products and the cascade input. As a result, the last MLP in the cascade provides, as an output, the sum of partial products of the entire cascade. By comparison with an FPGA that uses traditional connections, time and routing are both saved. To find the sum of the outputs of multiple MLPs using the routing 905, the outputs of the various MLPs would be sent, in existing FPGAs, as input to another MLP to sum the individual sums of partial products to determine the entire sum, but the additional routing between MLPs is not needed when the MLPs communicate through cascade connections. Additionally, the sequential operation of waiting until all MLPs had completed processing before beginning to determine the sum of sums of partial products introduces delays that are avoided when the output of each MLP is provided directly to the next MLP via the cascade connection. For example, the result is obtained in one clock cycle instead of two by performing the summations of partial products in the same clock cycle as the multiplies.

As a third example of the use of cascade communications, one operand is provided to each of multiple MLPs through the cascade chain and another operand is provided to each of the multiple MLPs using the routing fabric. For example, the cascade connection may be wide enough to hold one operand for each MLP (e.g., each MLP may operate on 8-bit operands and the cascade connection is 32 bits wide, allowing the connection to hold one operand for each of four MLPs). Even though the total routing used in the same in this example, the routing may be simplified by virtue of providing more connections to a single MLP instead of needing to route all operands to each MLP.

As a fourth example of the use of cascade communications, data or address information is communicated between BRAMs through the cascade chain. As a result, larger memories are created from smaller BRAMs. For example, the high address bits indicate which BRAM should process a read or write request. In this example, routing connects to only a single BRAM, but the request (and read data, in the case of a read request) are communicated between BRAMs using the cascade chain, providing more memory addresses of the same width as a single BRAM. As another example, each BRAM simultaneously responds to the request using the cascade address, but handles a separate portion of input data. This provides greater data width using the same number of memory addresses as a single BRAM.

In some example embodiments, the BRAM forward cascade connection comprises 144 bits of write data, a 14-bit address, a 7-bit block address, and control signals. The 14-bit address allows identification of one of 16,384 memory locations in a single BRAM. The 7-bit block address allows a particular BRAM of up to 128 cascade-connected BRAMs to be selected. The control signals indicate, e.g., whether data is being read or written. The BRAM reverse cascade connection comprises 144 bits of read data, the 14-bit address, the 7-bit block address, and the control signals. Read data is transferred from the BRAM identified by the block address so that the first BRAM in the cascade chain can provide the read data as output.

The block address can be set to target a specific BRAM for read or write. Thus, in an example embodiment, the BRAM forward cascade connection transmits data unchanged to all of the cascaded tiles, each of which has a unique block address. If the block address of the BRAM matches the block address indicated by the cascade connection, the BRAM performs the indicated operation. The other BRAMs do not perform the operation.

In some example embodiments, the control signals of the BRAM forward cascade connection comprise a mask. By applying a bitwise OR of the mask to the block address of the BRAM before comparing the masked block address of the BRAM to the block address indicated by the cascade connection, some bits of the BRAM block address are ignored when making the comparison. As a result, multiple tiles may match the indicated block address and perform the indicated operation. For example, if the block address for the operation is b'0001100 (decimal 12) and the mask is b'1111100, the four BRAMs having block addresses b'0001100 (decimal 12) to b'0001111 (decimal 15) will perform the operation. This may prove advantageous in machine learning applications, wherein multiple different operations are performed on input vectors. Thus, when each MLP has on-tile access to a BRAM storing the input vector (or a portion thereof), performance is improved.

As can be seen in FIG. 9, the operand cascade output 960A is configured to provide any one of: data received via the routing 905, data received at the operand cascade input 945A, the result from the MAC 930A, and the result from the MAC 935A. Similarly, the operand cascade output 960B is configured to provide any one of: data received via the routing 905, data received at the operand cascade input 945B, the result from the MAC 930B, and the result from the MAC 935B. Thus, when multiple FPGA tiles are connected by connecting the operand cascade output (e.g., the operand cascade output 960A) of one tile to the operand cascade input of the next tile (e.g., the operand cascade input 945B), a single input from the routing 905 can be transmitted via the cascade connections to the remaining FPGA tiles. By comparison to existing methods in which routing 905 resources would be used for each of the multiple FPGA tiles, substantial routing resources are saved. As a practical matter, provision of the same operand to multiple MLPs is useful in performing matrix multiplication operations, particularly for machine learning applications.

Similarly, the memory cascade output 965A is configured to provide any one of: data received via the routing 910, data received at the memory cascade input 955A, and data read from the memory 940A; the memory cascade output 965B is configured to provide any one of: data received via the routing 910, data received at the memory cascade input 955B, and data read from the memory 940B Additionally, the memory cascade connections are bidirectional. Accordingly, while the two cascade connections are labeled as "input" and "output," data may flow in either direction. Thus, an address may be propagated in one direction through multiple FPGA tiles via the cascade connections and a data result may be propagated in the other direction. As with the MLPs, using cascade connections for multiple BRAMs saves routing resources.

Figure 10:
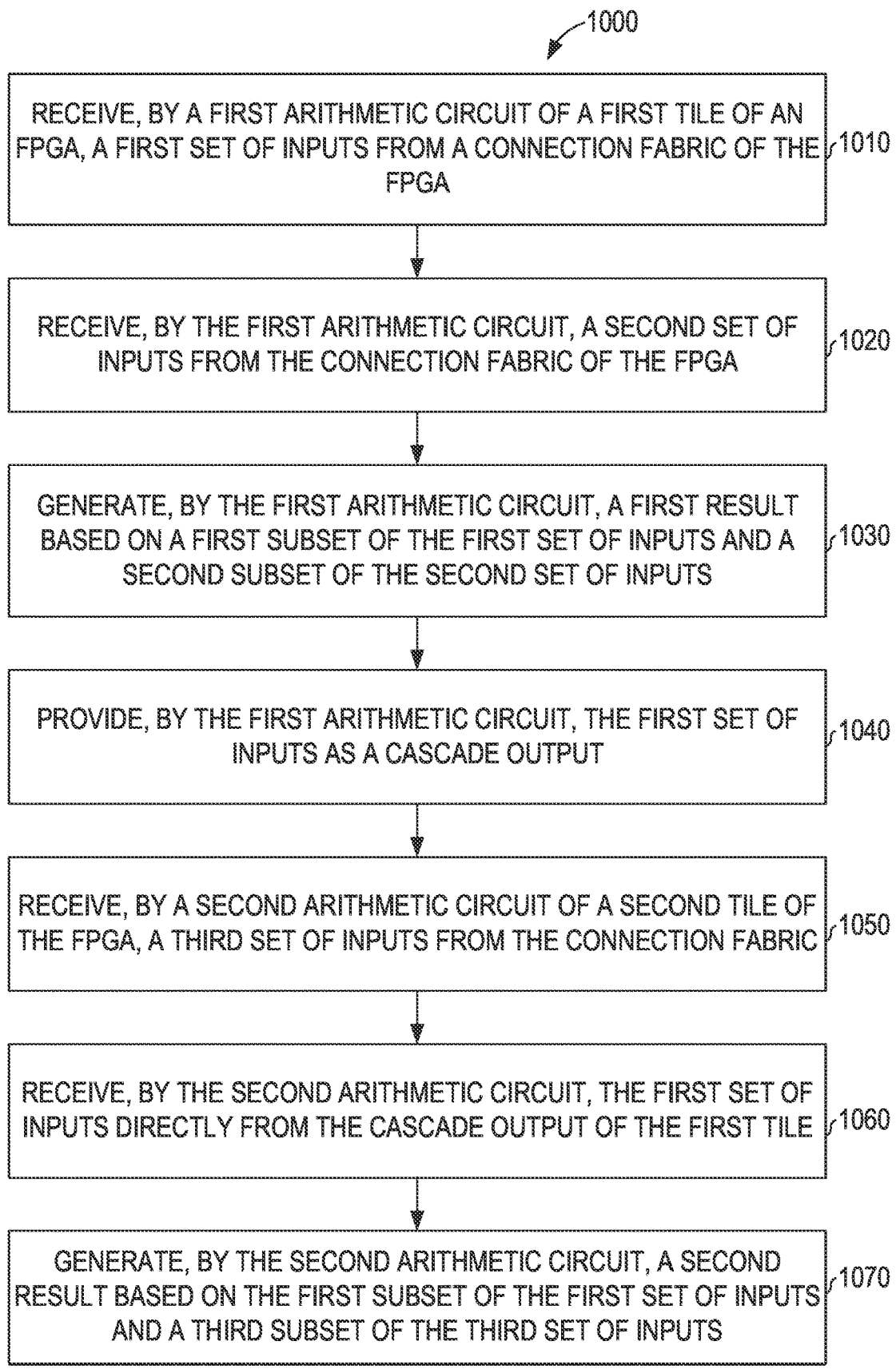
FIG. 10 is a flowchart illustrating operations of a method performed by a tile of an FPGA using cascade communications, according to various embodiments of the invention.

FIG. 10 is a flowchart illustrating operations of a method 1000 performed by a fused memory and arithmetic circuit, according to various embodiments of the invention. The method 1000 includes operations 1010, 1020, 1030, 1040, 1050, 1060, and 1070. By way of example and not limitation, the method 1000 is described as being performed by the circuits of FIGS. 1-9.

In operation 1010, a first arithmetic circuit of a first tile of an FPGA receives a first set of inputs from a connection fabric of an FPGA. As an example, the MLP 915A receives the first set of inputs from the routing fabric 905 of an FPGA. In this example, the first set of inputs comprises a row of a first matrix, for element-wise multiplication with a column of a second matrix in determining a partial result of a matrix multiplication.

The first arithmetic circuit, in operation 1020, receives a second set of inputs from the connection fabric of the FPGA. In this example, the MLP 915A receives the second set of inputs, comprising the column of the second matrix, from the routing fabric 905.

In operation 1030, the first arithmetic circuit generates a first result based on a first subset of the first set of inputs and a second subset of the second set of inputs. For example, the first result may be the product of a single element of the row of the first matrix and a single element of the column of the second matrix. As another example, the first result may be the sum of several products of elements of the row of the first matrix and corresponding elements of the column of the second matrix.

The tile of the FPGA provides, in operation 1040, the first set of inputs as a cascade output. In this example, the inputs at the operand cascade input 945A are routed to the operand cascade output 960A.

A second arithmetic circuit of a second tile of the FPGA, in operation 1050, receives a third set of inputs from the connection fabric. In this example, the MLP 915B receives the third set of inputs, comprising a second column of the second matrix, from the routing fabric 905.

In operation 1060, the second arithmetic circuit receives the first set of inputs directly from the cascade output of the first tile. Thus, in this example, the MLP 915A receives a row and a column through the routing 905, but the MLP 915B receives the same amount of data while only using half as much of the routing 905. Furthermore, the MLP 915B may be configured to propagate the first set of inputs directly from the operand cascade input 945B to the operand cascade output 960B, allowing another tile to also receive the first set of inputs without consuming routing resources. This process may be repeated to provide the first set of inputs to an arbitrary number of tiles.

The second arithmetic circuit, in operation 1070, generates a second result based on the first subset of the first set of inputs and a third subset of the third set of inputs. As used herein, a subset may comprise the entirety of a set. Thus, if 64 bits of data are provided by the cascade input and 64 bits of data are provided by the routing fabric, the arithmetic result may be based on any portion of the inputs, so long as it depends on both inputs. As an example, each of the 64 bits of input may be treated as eight 8-bit operands and the generated result may be the sum of eight multiplication operations performed on pairs of 8-bit operands, one operand in each pair received via the intra-tile communication and one operand in each pair received via the routing fabric of the FPGA.

Figure 11:
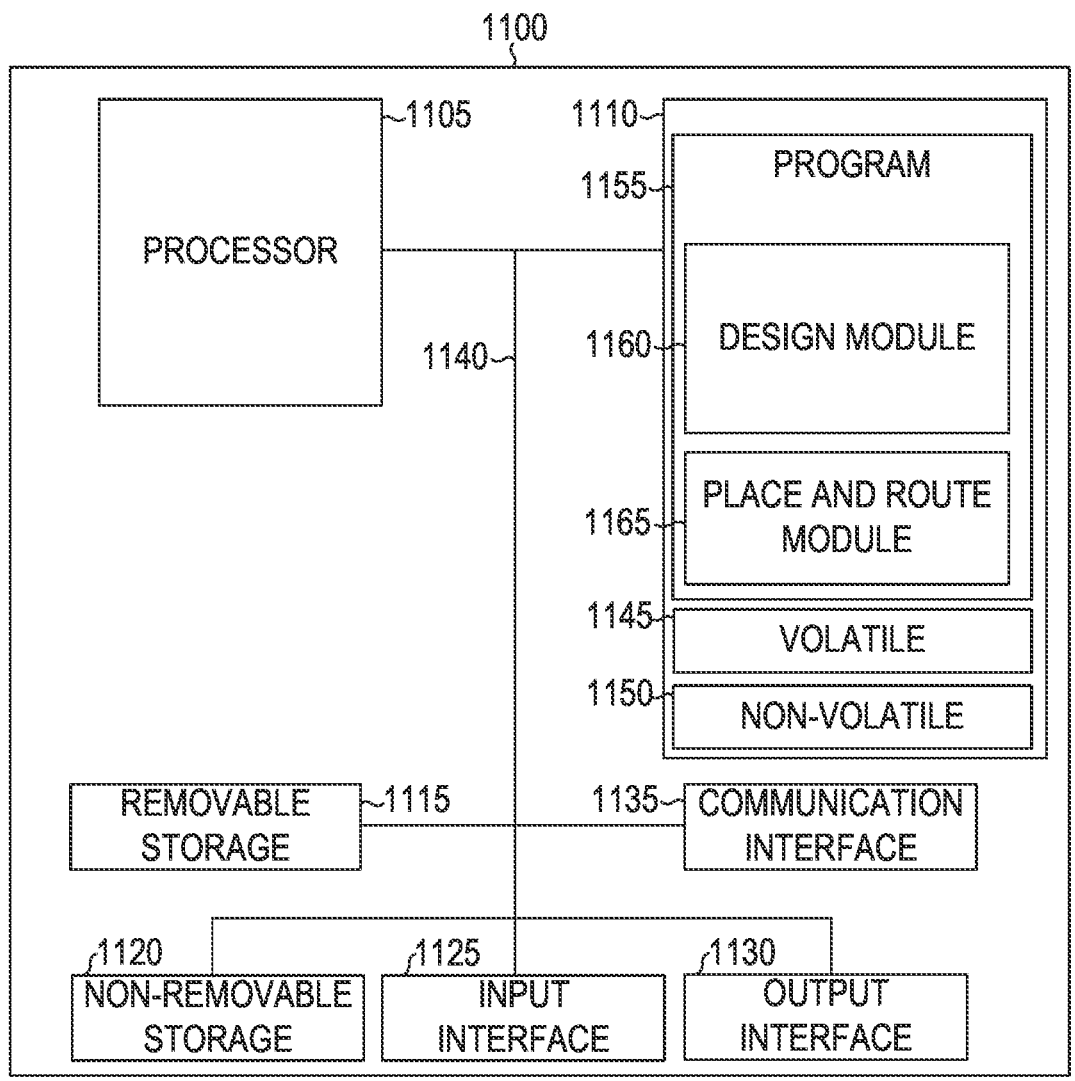
FIG. 11 is a block diagram illustrating components of a system for controlling fabrication of circuits described herein, according to some example embodiments.

FIG. 11 is a block diagram illustrating components of a computer 1100 that programs an FPGA, according to some example embodiments. All components need not be used in various embodiments. For example, clients, servers, autonomous systems, and cloud-based network resources may each use a different set of components, or, in the case of servers, for example, larger storage devices.

One example computing device in the form of a computer 1100 (also referred to as computing device 1100 and computer system 1100) may include a processor 1105, memory storage 1110, removable storage 1115, and non-removable storage 1120, all connected by a bus 1140. Although the example computing device is illustrated and described as the computer 1100, the computing device may be in different forms in different embodiments. For example, the computing device may instead be a smartphone, a tablet, a smartwatch, or another computing device including elements the same as or similar to those illustrated and described with regard to FIG. 11. Devices such as smartphones, tablets, and smartwatches are collectively referred to as "mobile devices." Further, although the various data storage elements are illustrated as part of the computer 1100, the storage may also or alternatively include cloud-based storage accessible via a network, such as the Internet, or server-based storage.

The memory storage 1110 may include volatile memory 1145 and non-volatile memory 1150 and may store a program 1155. The computer 1100 may include, or have access to, a computing environment that includes a variety of computer-readable media, such as the volatile memory 1145; the non-volatile memory 1150; the removable storage 1115; and the non-removable storage 1120. Computer storage includes random-access memory (RAM), read-only memory (ROM), erasable programmable read-only memory (EPROM) and electrically erasable programmable read-only memory (EEPROM), flash memory or other memory technologies, compact disc read-only memory (CD ROM), digital versatile disks (DVD) or other optical disk storage, magnetic cassettes, magnetic tape, magnetic disk storage or other magnetic storage devices, or any other medium capable of storing computer-readable instructions.

The computer 1100 may include or have access to a computing environment that includes an input interface 1125, an output interface 1130, and a communication interface 1135. The output interface 1130 may interface to or include a display device, such as a touchscreen, that also may serve as an input device. The input interface 1125 may interface to or include one or more of a touchscreen, a touchpad, a mouse, a keyboard, a camera, one or more device-specific buttons, one or more sensors integrated within or coupled via wired or wireless data connections to the computer 1100, and other input devices. The computer 1100 may operate in a networked environment using the communication interface 1135 to connect to one or more remote computers, such as database servers. The remote computer may include a personal computer (PC), server, router, network PC, peer device or other common network node, or the like. The communication interface 1135 may connect to a local-area network (LAN), a wide-area network (WAN), a cellular network, a WiFi network, a Bluetooth network, or other networks.

Computer instructions stored on a computer-readable medium (e.g., the program 1155 stored in the memory storage 1110) are executable by the processor 1105 of the computer 1100. A hard drive, CD-ROM, and RAM are some examples of articles including a non-transitory computer-readable medium such as a storage device. The terms "computer-readable medium" and "storage device" do not include carrier waves to the extent that carrier waves are deemed too transitory. "Computer-readable non-transitory media" includes all types of computer-readable media, including magnetic storage media, optical storage media, flash media, and solid-state storage media. It should be understood that software can be installed in and sold with a computer. Alternatively, the software can be obtained and loaded into the computer, including obtaining the software through a physical medium or distribution system, including, for example, from a server owned by the software creator or from a server not owned but used by the software creator. The software can be stored on a server for distribution over the Internet, for example.

The program 1155 is shown as including a design module 1160 and a place and route module 1165. Any one or more of the modules described herein may be implemented using hardware (e.g., a processor of a machine, an ASIC, an FPGA, or any suitable combination thereof). Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The design module 1160 defines a design of a circuit (e.g., a processor, signal processor, compute engine, state machine, or controller circuit). For example, the design module 1160 may provide a user interface to allow a user to design a circuit.

The place and route module 1165 determines the physical layout of the resulting integrated circuit based on the circuit design defined by the design module 1160. For example, a design comprising one or more tiles with fused memory and arithmetic circuits may be laid out by the place and route module 1165 in order to be programmed into the FPGA configuration.

The Abstract of the Disclosure is provided to comply with 37 C.F.R. § 1.72(b), requiring an abstract that allows the reader to quickly ascertain the nature of the technical disclosure. It is submitted with the understanding that it will not be used to interpret or limit the claims. In addition, in the foregoing Detailed Description, it may be seen that various features are grouped together in a single embodiment for the purpose of streamlining the disclosure. This method of disclosure is not to be interpreted as limiting the claims. Thus, the following claims are hereby incorporated into the Detailed Description, with each claim standing on its own as a separate embodiment.

What is claimed is:

1. A circuit comprising:
    a first tile of a field programmable gate array (FPGA) comprising a first multiply and accumulate (MAC) circuit and a first memory circuit, the first memory circuit coupled to a connection fabric of the FPGA to receive a read address, an input block address, and a mask, the first memory circuit configured to:
        generate a modified block address based on a block address of the first memory circuit and the mask; and
        access data based on the modified block address matching the input block address; and
    a second tile of the FPGA comprising a second MAC circuit and a second memory circuit, the first memory circuit coupled to the second memory circuit by a communication connection that does not use the connection fabric to receive the read address from the first tile.

2. The circuit of claim 1, wherein:
    the second memory circuit of the second tile of the FPGA is configured to store data received via the communication connection.

3. The circuit of claim 2, wherein:
    the second memory circuit of the second tile of the FPGA is configured to simultaneously perform a first operation and a second operation, the first operation providing first data to the second MAC circuit of the second tile of the FPGA, the second operation storing the data received via the communication connection with the first tile.

4. The circuit of claim 2, wherein the second memory circuit is configured to provide a first set of outputs to a third tile of the FPGA via a second communication connection that does not use the connection fabric.

5. The circuit of claim 1, wherein a bit of the read address indicates whether to provide data from the first memory circuit or the second memory circuit.

6. The circuit of claim 1, wherein data is provided from both the first memory circuit and the second memory circuit based on the read address.

7. The circuit of claim 1, wherein:
    in response to a configuration signal, the second MAC circuit is configured to receive a second set of inputs via a second communication connection that does not use the connection fabric from the first tile of the FPGA.

8. The circuit of claim 1, wherein the second MAC circuit is further configured to provide a first set of outputs to a third tile of the FPGA via a second communication connection that does not use the connection fabric.

9. A method comprising:
    receiving, by a first tile of a field programmable gate array (FPGA) comprising a first multiply and accumulate (MAC) circuit and a first memory circuit, from a connection fabric of the FPGA, a read address, an input block address, and a mask;
    generating, by the first tile, a modified block address based on a block address of the first memory circuit and the mask;
    accessing, based on the modified block address matching the input block address, data; and
    transmitting, by the first tile of the FPGA to a second tile of the FPGA comprising a second MAC circuit and a second memory circuit, the read address via a communication connection that does not use the connection fabric.

10. The method of claim 9, further comprising:
    storing, by the second memory circuit of the second tile of the FPGA, data received via the communication connection.

11. The method of claim 10, further comprising:
    simultaneously performing, by the second memory circuit of the second tile of the FPGA, a first operation and a second operation, the first operation providing first data to the second MAC circuit of the second tile of the FPGA, the second operation storing the data received via the communication connection.

12. The method of claim 9, further comprising:
providing, by the second memory circuit, a first set of outputs to a third tile of the FPGA via a second communication connection that does not use the connection fabric.

13. The method of claim 9, wherein a bit of the read address indicates whether to provide data from the first memory circuit or the second memory circuit.

14. The method of claim 9, wherein data is provided from both the first memory circuit and the second memory circuit based on the read address.

15. A non-transitory machine-readable storage medium containing instructions that, when executed by one or more processors, cause the one or more processors to control configuration of a field programmable gate array (FPGA) comprising:
a first tile comprising a first multiply and accumulate (MAC) circuit and a first memory circuit, the first memory circuit coupled to a connection fabric of the FPGA to receive a read address, an input block address, and a mask, the first memory circuit configured to:
generate a modified block address based on a block address of the first memory circuit and the mask; and
access data based on the modified block address matching the input block address; and
a second tile comprising a second MAC circuit and a second memory circuit, the first memory circuit coupled to the second memory circuit by a communication connection that does not use the connection fabric to receive the read address from the first tile.

16. The non-transitory machine-readable storage medium of claim 15, wherein:
the second memory circuit of the second tile of the FPGA is configured to store data received via the communication connection.

17. The non-transitory machine-readable storage medium of claim 16, wherein:
the second memory circuit of the second tile of the FPGA is configured to simultaneously perform a first operation and a second operation, the first operation providing first data to the second MAC circuit of the second tile of the FPGA, the second operation storing the data received via the communication connection.

18. The non-transitory machine-readable storage medium of claim 16, wherein the second memory circuit is configured to provide a first set of outputs to a third tile of the FPGA via a second communication connection that does not use the connection fabric.

19. The non-transitory machine-readable storage medium of claim 15, wherein a bit of the read address indicates whether to provide data from the first memory circuit or the second memory circuit.

20. The non-transitory machine-readable storage medium of claim 15, wherein data is provided from both the first memory circuit and the second memory circuit based on the read address.

* * * * *

UNITED STATES PATENT AND TRADEMARK OFFICE
CERTIFICATE OF CORRECTION

| | |
|---|---|
| PATENT NO. | : 11,734,216 B2 |
| APPLICATION NO. | : 17/675549 |
| DATED | : August 22, 2023 |
| INVENTOR(S) | : Pugh et al. |

It is certified that error appears in the above-identified patent and that said Letters Patent is hereby corrected as shown below:

On the Title Page

On page 2, in Column 1, item (56) under "U.S. Patent Documents", Line 8, delete "2005/0014421" and insert --2005/0144210-- therefor In the Specification In Column 6, Line 17, delete "REGFILE_DOUT[71:0]," and insert --REGFILE_DOUT[71:0];-- therefor In Column 6, Line 23, delete "MLP_DFN[71:0];" and insert --MLP_DIN[71:0];-- therefor In Column 6, Line 40, delete "FWDO_MULTIB_H[71:0]," and insert --FWDO_MULTB_H[71:0],-- therefor In Column 6, Line 41, delete "FWDO_MULTA_L[71.0]," and insert --FWDO_MULTA_L[71:0],-- therefor In Column 7, Line 54, delete "is" and insert --1s-- therefor Signed and Sealed this
Eighth Day of October, 2024

Katherine Kelly Vidal
*Director of the United States Patent and Trademark Office*